United States Patent Office 3,344,182
Patented Sept. 26, 1967

3,344,182
PROCESS FOR PRODUCING ORGANIC
SULFONYL SEMICARBAZIDES
Roger W. Amidon, Oxford, Conn., assignor to United
States Rubber Company, New York, N.Y., a corporation of New Jersey
No Drawing. Filed Dec. 7, 1964, Ser. No. 416,626
5 Claims. (Cl. 260—554)

This invention relates to an improved process for producing organic sulfonyl semicarbazides, which chemicals have particular utility as chemical blowing agents.

Previous processes for the production of organic sulfonyl semicarbazides are described in U.S. Patent No. 3,152,176, dated Oct. 6, 1964, to Byron A. Hunter. The less preferred method involves the reaction of an organic sulfonyl halide with semicarbazide, but this method involves the use of a costly, relatively unavailable semicarbazide salt. An illustration of the use of this method appears as Example (A)(2) in the indicated patent. The preferred preparative method of the Hunter patent involves the reaction of an organic sulfonyl hydrazide with cyanic acid. With regard to the production of organic sulfonyl semicarbazides by the cyanic acid route, this technique leaves something to be desired as regards yields, reaction time and product purity. Because of these factors and the approximately 85¢ per pound price of the starting cyanate salts, the economics of this technique are not favorable for commercial production. The purification of the products requires recrystallization and an acetone treatment. Another factor leading to the unfavorable economics is the relatively large volume of reactants required in this technique.

An object of the present invention is to provide an improved method for the production of organic sulfonyl semicarbazides. A further objective is to provide a preparative method for these blowing agents which is commercially feasible from an economic standpoint.

These objectives are realized through the production of organic sulfonyl semicarbazides by the reaction of the corresponding organic sulfonhydrazides with urea under the conditions specified below. This reaction results in yields of the desired products in amounts of up to 89% of theoretical and utilizes urea as one of the reactants, a chemical costing about 5¢ per pound. The preparative method of this invention can be represented by Equation 1 below, while the reaction for the preparation of the sulfonhydrazide starting material is represented by Equation 2 below:

(1)  $RSO_2NHNH_2 + H_2NCONH_2 + H^+ \rightarrow$
$RSO_2NHNHCONH_2 + NH_4^+$
(2)  $RSO_2Cl + NH_2NH_2 + NH_4OH \rightarrow$
$RSO_2NHNH_2 + NH_4Cl + H_2O$ where R is aliphatic or aromatic.

In the products formed by the process of this invention, the sulfonyl group is directly linked to the aliphatic or aromatic radicals, which are preferably hydrocarbon, including aralkyl, groups. Aliphatic sulfonyl semicarbazides, which can desirably be produced by the process of this invention, include those represented by the following formulae:

$RSO_2NHNHCONH_2$
$R'(SO_2NHNHCONH_2)_2$ where R and R' are monovalent and bivalent unsubstituted aliphatic hydrocarbon radicals, respectively. Actually, these formulae also represent the compounds in which R and R' are araliphatic hydrocarbon radicals. Illustrative of typical aliphatic and araliphatic sulfonyl semicarbazides which can be produced satisfactorily by the process of this invention are:

Methane sulfonyl semicarbazide
Ethane sulfonyl semicarbazide
Propane sulfonyl semicarbazide
Isopropane sulfonyl semicarbazide
Butane sulfonyl semicarbazide
Isobutane sulfonyl semicarbazide
Pentane sulfonyl semicarbazide
Hexane sulfonyl semicarbazide
Octane sulfonyl semicarbazide
Dodecane sulfonyl semicarbazide
Octadecane sulfonyl semicarbazide
Cyclohexane sulfonyl semicarbazide
Ethane bis-(sulfonyl semicarbazide)
Propane-1,2-bis-(sulfonyl semicarbazide)
Butane-1,4-bis-(sulfonyl semicarbazide)
Oxy bis-(ethane sulfonyl semicarbazide)
Thio bis-(ethane sulfonyl semicarbazide)
Alpha-toluene sulfonyl semicarbazide
Xylylene bis-(sulfonyl semicarbazide)

Aromatic sulfonyl semicarbazides, which are among the products which can be suitably formed by the process of this invention, are represented by the following formulae:

$R''(SO_2NHNHCONH_2)_n$
$X(C_6H_4SO_2NHNHCONH_2)_2$ where R'' is an unsubstituted or alkyl-substituted aromatic hydrocarbon radical, n is an integer from 1 to 3 and X is an oxygen, sulfur, sulfonyl, sulfoxy (=S=O) or methylene radical.

Examples of aromatic sulfonyl semicarbazides which are satisfactorily prepared by the process of this invention include:

Benzene sulfonyl semicarbazide
p-Toluene sulfonyl semicarbazide
o-Toluene sulfonyl semicarbazide
Benzene-1,3-bis-(sulfonyl semicarbazide)
Toluene bis-(sulfonyl semicarbazide)
Xylene sulfonyl semicarbazide
Xylene bis-(sulfonyl semicarbazide)
Benzene tris-(sulfonyl semicarbazide)
Biphenylene bis-(sulfonyl semicarbazide)
Naphthalene sulfonyl semicarbazide
Naphthalene bis-(sulfonyl semicarbazide)
Naphthalene tris-(sulfonyl semicarbazide)
p-p'-Oxy bis-(benzene sulfonyl semicarbazide)
p,p'-Thio bis-(benzene sulfonyl semicarbazide)
p,p'-Methylene bis-(benzene sulfonyl semicarbazide)
p,p'-Sulfonyl bis-(benzene sulfonyl semicarbazide)
p,p'-Sulfoxy bis-(benzene sulfonyl semicarbazide)

Actually, the aromatic radicals can include any type of substituent, although it is preferred that the substituents be limited to those which are unreactive with urea. Among the suitable substituents for the purposes of this invention are halogen atoms and alkyl, alkoxyl, dialkylamino, acylamino, acyloxy, aryl, aryloxy and arylamino groups. However, the presence of substituents on the hydrocarbon radicals detracts from the utility of the sulfonyl semicarbazides as blowing agents. Particularly to be avoided in this latter regard are substituents containing nitrogen attached directly to the aromatic ring, since such groups not only add unnecessary bulk to the compound but are liable to produce discoloration in the rubber or plastic into which they are introduced. The effect of unnecessary bulk is to diminish the efficiency of the compound as a blowing agent. In general, for optimum efficiency as blowing agents, the organic sulfonyl semicarbazides, which contain a maximum of 10 carbon atoms per sulfonyl semicarbazide group, are preferred.

In the reaction between the sulfonhydrazide and urea, as represented by Equation 1, the molar ratio of the sulfonhydrazide to urea is desirably from 1:1 to 1:12, with the preferred molar ratio being about 1:8. The amount of urea used should not be less than that represented by a molar ratio of 1:1. While the amount of urea can exceed that represented by a molar ratio of 1:12, the procedure becomes inefficient when the amount of urea used is increased beyond the indicated point.

The pH of the reaction mixture should be maintained in the range of from about 0.5 to about 6.75, the more preferred range for the pH being from about 1.5 to about 3.5. It will be noted from the above Equation 1 that the addition of acid is required to catalyze the reaction. The acid to be used for this purpose should desirably have an ionization constant greater than $1 \times 10^{-5}$ and may be organic as well as inorganic; in the latter case, the acids need not be restricted to non-oxidizing types. The use of organic acids is not preferred, since the quantities required to provide the optimum pH may diminish the yield of the product through adversely affecting the solubilities of the reaction by-products and the desired product, the point here being that the latter material is insoluble in water and certain of the reaction by-products are quite soluble in water. Suitable acids for use in the adjustment of pH include concentrated sulfuric acid, concentrated hydrochloric acid (which can be buffered with sodium citrate-citric acid, as described in Kolthoff and Laitinen, "pH and Electrotitrations," page 36, second edition, John Wiley & Sons, 1944) and phosphoric acid. The use of a concentrated acid for controlling the pH is, in fact, desired, since such use contributes to avoiding excessive dilution of the reaction mixture and thus to avoid hydrolysis of the sulfonhydrazide.

For the same reason of avoiding hydrolysis of the sulfonhydrazide, the amount of water present during the reaction should not be excessive. A desirable maximum on the amount of water to be present during the reaction is 1 liter per mole equivalent of sulfonhydrazide groups. Although more water than the amount just specified can be present, the results become increasingly unsatisfactory as the amount of water is increased. The less satisfactory results include decreased yields, increased reaction times and, consequently, increased hydrolysis of the sulfonhydrazide, and decreased productivity because less product can be formed in a reactor of given size in a specified unit of time. As regards the other end of the scale on amounts of water to be present during the reaction, it is greatly to be desired that sufficient water be present so that the reaction mixture is fluid or mobile, thereby enabling adequate agitation at the temperature of the reaction. While there is no specific lower limit on the amount of water which can be present, it has been found that a lower limit of 250 ml. of water per mole equivalent of sulfonhydrazide groups is about at the point where good mixing and good reaction control with respect to temperature and pH can no longer be obtained to the desired extent.

The process of this invention is preferably conducted at the reflux temperature of the reaction mixture which can, under atmospheric pressure conditions, be as high as 110° C. The reaction temperatures can be increased (with resulting decreases in reaction time) through the use of super atmospheric pressures. As the temperature is decreased below the reflux temperature, the yields gradually fall off, 80° C. being considered to be an acceptable minimum reaction temperature from this standpoint.

The periods of reaction in the process of this invention are preferred to be from about 2 to about 4 hours. While the outside limits on periods of reaction can range from about 0.5 hour to about 15 hours, shorter reaction times than 2 hours result in lower yields and poor quality due to the presence of unreacted starting material, and longer reaction times than 4 hours result in lowered yields due to acid hydrolysis of the sulfonhydrazide.

While agitation of the reaction mixture is desirable, no special type of agitation is required. Sufficient surface mixing to permit supersurface addition of a concentrated acid is all that need be specified.

Following the completion of the reaction, additional water may be added to the reaction mixture to solubilize the by-products. The product is then desirably isolated by filtration at 80° C. and all traces of the acid used in maintaining pH are removed by water washing. If desired, the resulting product can be slurried in or washed with acetone to upgrade the purity and thereby raise the decomposition point.

Although the preparation of the starting sulfonhydrazide does not form part of the present invention, a typical preparation is presented in Example 1 below for completeness of this disclosure.

*Example 1.—Preparation of p-toluene sulfonhydrazide* p-Toluene sulfonyl chloride (95 g.; 0.5 mole) is charged to a 1 liter, 5-neck flask equipped with a thermometer, an addition funnel and a stirrer. Water (300 ml.) is added to the flask. Agitation of the resulting mixture is started and, after 30 seconds, the dropwise addition of 31 g. (0.53 mole) of hydrazine hydrate (85%) is started. The temperature of the reaction mixture is raised to 45°–50° C. by the use of a heating mantle and is controlled in that range by the rate of addition of the hydrazine hydrate. Occasional water cooling of the reaction mixture may also be necessary to control the temperature. The pH at this stage is in the range of 7–8. The hydrazine hydrate addition takes about 15 minutes. Immediately after the completion of this addition, dropwise addition of ammonium hydroxide is commenced, the reaction temperature being maintained at about 45°–48° C. and the pH being maintained at 8.0–8.5. The ammonium hydroxide addition takes about 15 minutes. The reaction mixture is then further agitated for 1.5 hours. It is then cooled to 10°–15° C. and the resulting white product is separated by filtration. This product is washed with cold water and dried in an oven at 50° C. The resultant product had a melting point of 103°–108° C., and was obtained in a yield of 89% of theoretical.

*Example 2.—Preparation of p-toluene sulfonyl semicarbazide* p-Toluene sulfonhydrazide (46.5 g.; 0.25 mole), urea (120 g.; 2.0 moles) and water (90.0 ml.) are charged to a 500 ml., 5-neck flask equipped with an agitator, glass electrode, calomel electrode, temperature compensator, an acid addition funnel and a reflux condenser. The reaction mixture is agitated throughout the reaction. The first step is the heating of the reaction mixture, using a mantle, to 80° C., at which point concentrated sulfuric acid is added dropwise to adjust the pH to 1.8–2.0. The reaction mixture is then heated to 100°–102° C., and this reaction temperature and a pH of 1.8–2.0 are maintained for three hours by the application of heat and the addition of concentrated sulfuric acid at intervals, respectively. The total volume of acid required during this preparation is 50 ml. At the beginning of the reaction, the mixture is nearly clear. As the reaction continues, precipitation of the product occurs gradually. At the end of the three hour reaction period, 150 ml. of water are added and the mixture is further agitated for 15 minutes. The product is separated by filtration at 80° C. and is washed with water to effect the removal of sulfate ion. The product is then dried in an oven at 50° C. The decomposition point of the p-toluene sulfonyl semicarbazide obtained was 234°–236° C. and the product yield was 88% of theoretical.

With the foregoing as the standard reaction conditions for the present comparative purposes, listed below are the effects of changing one of the reaction variables at a time:

| pH: | Yield percent (of theor.) |
| --- | --- |
| 1.0–1.2 | 81.5 |
| 1.8–2.0 | 88 |
| 2.8–3.0 | 88 |
| 3.5–3.6 | 80 |

Reaction temperature, ° C.:

| | |
| --- | --- |
| 100–102 | 88 |
| 95–98 | 85 |

Reaction time, hrs.:

| | |
| --- | --- |
| 2 | 81 |
| 3 | 88 |
| 4 | 86 |

| Water (ml.) | Amount of Water/ mole Equiv. of Sulfonhydrazide Groups (ml.) | Yield Percent (of theor.) |
| --- | --- | --- |
| 60 | 240 | 86 |
| 90 | 360 | 88 |
| 140 | 560 | 88 |

| Urea (g.) | Molar Ratio of Sulfonhydrazide to Urea | Yield Percent (of theor.) |
| --- | --- | --- |
| 60 | 1:4 | 81 |
| 120 | 1:8 | 88 |
| 180 | 1:12 | 85 |

The following experiments were conducted under the same general conditions as those used in Example 2 except for the indicated modifications.

*Example 3.—Preparation of benzene sulfonyl semicarbazide*

To a suspension of 86 g. (0.5 m.) of benzene sulfonhydrazide in 180 ml. of water were added 120 g. (2 m.) of urea. The mixture was heated to reflux temperature with stirring and enough sulfuric acid was added to produce a pH of 1.8. Reflux was maintained and additional acid was added to keep the pH at 1.8–2.0. After 2 hours of reaction at 100° C., 86 g. of product were separated by filtration; M.P. 220° C. (dec.) Five grams of additional crude product were obtained from the chilled filtrate. The total yield was 84.7% of theoretical.

*Example 4.—Preparation of naphthalene 2-sulfonyl semicarbazide*

A mixture of 39 g. (.175 m.) of naphthalene 2-sulfonhydrazide and 42 g. (.7 m.) of urea was heated to reflux in 100 ml. of water. Sulfuric acid was added to bring the pH of the mixture to 1.55. Heating was continued over a two-hour period during which time additional acid was added incrementally to maintain the pH at 1.55–1.98. A crude yield of 34 g. (86% of theoretical) was obtained from the final reaction mixture at 5° C. Decomposition temperature of the crude product was 200° C. Washing with hot methanol improved the purity of the product, yielding a product having a melting point of 225°–230° C. (dec.).

*Example 5.—Preparation of 3,4-dichlorobenzene sulfonyl semicarbazide*

A mixture of 90 g. (.37 m.) of 3,4-dichlorobenzene sulfonhydrazide, 89.5 g. (1.5 m.) of urea, and 250 ml. of water was brought to reflux temperature with stirring, and the pH was adjusted to 1.7 by the addition of sulfuric acid. Heating was continued for nearly 2 hours, during which time incremental addition of concentrated sulfuric acid was made so that the pH stayed between 1.7 and 2.5.

30 g. (28% of theoretical) of crude material, containing some starting hydrazide, was removed from the hot solution. The hydrazide was separated by washing the crude material with hot alcohol. The dried product melted with decomposition at 205° C.; yield 21 g.

*Example 6.—Preparation of p-N-acetoaminobenzene sulfonyl semicarbazide*

A suspension of 105 g. of the precursor hydrazide and 110 g. of urea was heated in 250 ml. of water at 100° C. for 1.5 hours with the pH being maintained at 1.4–2.8 by the addition of concentrated sulfuric acid. 80 g. (65% of theoretical) of yellow solid was separated from the reaction suspension at room temperature; this solid melted at 205°–210° C. (dec.). The melting point was raised to 225° C. (dec.) by triturating the crude product with acetone. The identity of this product was confirmed by running a mixed melting point with a sample obtained from p-N-acetoaminobenzene sulfonyl chloride and semicarbazide.

*Example 7.—Preparation of benzene-1,3-bis sulfonyl semicarbazide*

A suspension of 103 g. benzene-1,3-bis sulfonhydrazide (0.39 mole) and 180 g. (3 moles) of urea in 250 ml. of water was heated to reflux with stirring. Sulfuric acid was added in sufficient quantity (18 ml.) to bring the pH to 2.0, and the pH was maintained between 1.87 and 2.07 over the reaction period of 2 hours by further addition of sulfuric acid. Brittle solid (27 g.) (19.7% of theoretical) was separated from the hot solution, this solid having a M.P. of 170° C. (dec.). The filtrate, when cooled, yielded 10 g. of crystalline solid, M.P. 189° C. (dec.). A crystalline portion of the brittle solid was found to melt at 193° C. (dec.).

*Example 8.—Preparation of oxy-4,4'-bis-benzene sulfonyl semicarbazide*

Oxy-4,4'-bis-benzene sulfonhydrazide (45 g.; 0.125 mole), urea (60 g.), and 225 ml. of water were charged to a 1-liter flask. This mixture was heated to 60° C., and the pH was adjusted to 1.5 by the dropwise addition of concentrated sulfuric acid. The reaction mixture was then heated to 100°–102° C., and this temperature and a pH of 1–2 were maintained for 9 hours. Water (300 ml.) was then added; the mixture was agitated for 30 minutes and was then filtered at 85° C. The product was washed sulfate free with water, and was dried in an oven at 50° C. Yield, 52.5% of theoretical; dec. pt., 211°–212° C. Actually, the recovered solids were the mixed hydrazide-semicarbazide.

*Example 9A.—Preparation of 4-butane sulfonhydrazide*

A solution of 38.3 g. of anhydrous hydrazine (97%) in 100 ml. of chloroform was added to 89 g. of butane sulfonyl chloride in 300 ml. of chloroform with cooling. Hydrazine hydrochloride was removed by filtration at 0° C. and the chloroform was removed from the filtrate by evaporation. There remained 91 g. of yellow oil (theory: 86.4 g.).

B.—Preparation of 4-butane sulfonyl semicarbazide

The oil from above (69 g.; 0.45 m.) was dissolved in 250 ml. of water along with 172 g. of urea. The mixture was heated to boiling and enough sulfuric acid was added to bring the pH to 2.0. Heating at reflux was continued for 2 hours during which time incremental addition of concentrated sulfuric acid was effected to maintain the pH at 2.0–2.3. The product was recovered by filtration at 5° C. Yield: 90 g. (81% of theoretical); M.P. 185°–186° C. (dec.).

Example 10A.—Preparation of methane sulfonhydrazide

To a solution of 33.5 g. of anhydrous hydrazine (97%) in 250 ml. of water were added 115 g. of methane sulfonyl chloride and 167 ml. of 6 N sodium hydroxide in 230 ml. of water concurrently. The temperature was maintained below 5° C. The homogenous solution was evaporated under vacuum and alcohol was added. The slurry was filtered to remove sodium chloride. The alcohol was evaporated to yield 121 g. of crude methane sulfonhydrazide (theory: 110 g.).

B.—Preparation of methane sulfonyl semicarbazide

The oil from above (98 g.; 0.9 m.) and 240 g. of urea were dissolved in 180 ml. of water and the solution was heated at 100°–110° C. for 2.4 hours. The pH was maintained at about 2 with concentrated sulfuric acid. The solid which precipitated was removed at 2° C. Yield: 133 g. (87% of theoretical); M.P. 188° (dec.). Recrystallization of 25 g. from 150 ml. of water led to the recovery of 15 g. having a M.P. of 192° C. (dec.).

Example 11.—Preparation of trichloromethane sulfonyl semicarbazide

A mixture of 92 g. of trichloromethane sulfonhydrazide (.43 m.), 91 g. of urea and 200 ml. of water was heated to reflux temperature, whereupon solution resulted. Concentrated sulfuric acid was added to bring the pH to 1.8. Subsequent additions of acid were required to maintain the pH at 1.8 to 2.3. Some sulfur dioxide was given off. After boiling the reaction mixture for 1.4 hours, the resulting suspension of solids was cooled to 5° C. and the product was separated by filtration. The yield was 39 g. (33% of theoretical); M.P. 249°–250° (dec.).

Example 12.—Preparation of p-toluene sulfonyl semicarbazide (no acid catalyst)

A 1 liter, 5-neck flask was charged with 47.6 g. (0.25 m.) of p-toluene sulfonhydrazide, 15.0 g. (0.25 m.) of urea, and 500 ml. of water. The mixture was brought to boiling and maintained at reflux for 7 hours. Some precipitation was noticed after 2.5 hours. During the period of heating, the pH drifted from 3.1 to 6.75.

The suspension was filtered while hot and 3.5 g. p-toluene sulfonyl semicarbazide, M.P. 235° C. (dec.), was removed. Additional product, 7.0 g., M.P. 236° C. (dec.), was removed from the filtrate at 10° C. the total yield of product was 18% of the theoretical. It will be noted that the amount of water used (2 liters/mole of sulfonhydrazide) was in excess of the desirable maximum for this value as specified above.

Example 13.—Preparation of p-toluene sulfonyl semicarbazide (HCl catalyst)

The reaction flask was charged with 23.25 g. (0.125 m.) p-toluene sulfohydrazide, 15 g. (0.25 m.) urea, 300 ml. of water and 2.5 ml. of concentrated hydrochloric acid. The mixture was stirred while being maintained at 88°–90° C. for six hours. The pH was maintained at 2–3 by incremental addition of 3.2 ml. of concentrated hydrochloric acid during the period of reaction.

The suspension was cooled to 5° C. and the product was separated by filtration. The crude toluene sulfonyl semicarbazide was washed with methanol, and the methanol was removed by evaporation; yield: 9 g. (31.4% of theoretical); M.P. 233° C. (dec.). Again, the amount of water used (2.4 liters/mole of sulfonhydrazide) was in excess of the desirable amounts set forth above.

Example 14.—Preparation of p-toluene sulfonyl semicarbazide (citric acid—HCl buffer)

A solution of 300 ml. of sodium citrate-citric acid buffer (described in Kolthoff & Laitinen, "pH and Electrotitrations," p. 36, Second edition, John Wiley and Sons, 1944) having a pH of 4.0 was charged to a reaction flask along with 23.25 g. (0.125 m.) of p-toluene sulfonhydrazide and 15 g. (0.25 m.) of urea. The mixture was brought to 100° C. and maintained at reflux temperature for five hours. Incremental addition of concentrated hydrochloric acid was necessary to maintain at pH at 3.80 to 4.58.

At the conclusion of the reaction, the aqueous suspension was filtered while hot. A small amount of semicrystalline solid (1.5 g.) was recovered. The filtrate, when cooled to 5° C., yielded 4.0 g. of additional crude product. After the latter was washed with methanol, the material melted at 236°– 242° C. (dec.). The total yield was 18% of theoretical. It will be noted that the amount of water used was more than 2 liters/mole of sulfonhydrazide.

Example 15.—Preparation of p-toluene sulfonyl semicarbazide (phosphate buffer)

Example 14 was duplicated except that 300 ml. of .1 molar monosodium phosphate solution, brought to a pH of 1 with phosphoric acid, was used, the duration of the reaction was six hours, and the pH was maintained at 1.0 by the incremental addition of phosphoric acid. A product having a M.P. of 236° C. (dec.) was obtained after the crude product (13.85 g.; 48% of theoretical) was washed with ethanol.

The utility of the organic sulfonyl semicarbazides as chemical blowing agents is amply demonstrated in U.S. Patent No. 3,152,176.

The advantages of the present process for producing such sulfonyl semicarbazides relate to the readily attainable improved quality and quantity of products, the economic benefits resulting from the ability to use an inexpensive starting material and the improved productivity resulting from the ability to produce more product per unit of reaction volume. While the process of this invention can be utilized for the production of organic sulfonyl semicarbazides generally, the advantages of this process are most fully realized when the organic substituent is an unsubstituted hydrocarbon radical. The latter type of product also produces the greatest advantages when utilized as a chemical blowing agent.

I claim:

1. A process for producing organic sulfonyl semicarbazides which comprises reacting the corresponding organic sulfonhydrazide with urea at a molar ratio of from 1:1 to 1:12 and at a pH in the range of 0.5 to 6.75 in the presence of a maximum of 1 liter of water per mole equivalent of sulfonhydrazide groups.

2. The process of claim 1, in which said sulfonhydrazide is a compound of the formula $$ArSO_2NHNH_2$$

wherein Ar is selected from the group consisting of phenyl, lower alkyl phenyl and naphthyl.

3. The process of claim 1, in which said sulfonhydrazide is an alkyl sulfonhydrazide.

4. The process of claim 1, in which the pH is maintained in the specified range by the use of an acid having an ionization constant greater than $1 \times 10^{-5}$.

5. The process of claim 1, in which the reaction temperature is maintained in the range from 80° C. up to and including the reflux temperature of the reaction mixture.

References Cited

UNITED STATES PATENTS 3,152,176  10/1964  Hunter ------------- 260—554

OTHER REFERENCES

Kurzer: Chemical Reviews, vol. 50 (1952), page 5.

Peyron: Bull. Soc. Chem., France (1954), pages D12–14.

Taylor et al.: Organic Chemistry of Nitrogen (1937), pages 278–279.

HENRY R. JILES, *Primary Examiner.*

UNITED STATES PATENT OFFICE
CERTIFICATE OF CORRECTION

Patent No. 3,344,182　　　　　　　　　　　September 26, 1967

Roger W. Amidon

It is hereby certified that error appears in the above numbered patent requiring correction and that the said Letters Patent should read as corrected below.

In the heading to the printed specification, lines 4 and 5, for "assignor to United States Rubber Company, New York, N. Y." read -- assignor to Uniroyal, Inc. --.

Signed and sealed this 26th day of November 1968.

(SEAL)
Attest:

Edward M. Fletcher, Jr.　　　　　　　　　　EDWARD J. BRENNER
Attesting Officer　　　　　　　　　　　　　Commissioner of Patents